United States Patent [19]
Behn et al.

[11] Patent Number: 4,635,164
[45] Date of Patent: Jan. 6, 1987

[54] ELECTRICAL CAPACITOR AND METHOD FOR THE MANUFACTURE THEREOF

[75] Inventors: Reinhard Behn, Munich; Ferdinand Utner, Regensburg, both of Fed. Rep. of Germany

[73] Assignee: Siemens Aktiengesellschaft, Berlin and Munich, Fed. Rep. of Germany

[21] Appl. No.: 841,262

[22] Filed: Mar. 19, 1986

[30] Foreign Application Priority Data

Mar. 22, 1985 [DE] Fed. Rep. of Germany ....... 3510518

[51] Int. Cl.$^4$ .................. H02B 1/04; H01G 13/06; H01G 4/08
[52] U.S. Cl. .................. 361/306; 29/25.42; 361/323
[58] Field of Search ............... 29/25.42; 361/303–306, 361/308–310, 321, 323

[56] References Cited

U.S. PATENT DOCUMENTS

| | | | |
|---|---|---|---|
| 3,444,436 | 5/1969 | Coda | 361/405 |
| 3,590,347 | 6/1971 | Gottlob et al. | 29/25.42 X |
| 3,614,561 | 10/1971 | Behn et al. | 29/25.42 X |
| 3,651,548 | 3/1972 | Behn | 29/25.42 |
| 4,041,587 | 8/1977 | Kraus | 29/25.42 |
| 4,504,884 | 3/1985 | Vetter | 361/323 |
| 4,563,724 | 1/1986 | Behn | 361/306 |

FOREIGN PATENT DOCUMENTS

| | | |
|---|---|---|
| 0011033 | 5/1980 | European Pat. Off. . |
| 0144857 | 6/1985 | European Pat. Off. . |
| 1940036 | 2/1971 | Fed. Rep. of Germany . |
| 1764548 | 5/1971 | Fed. Rep. of Germany . |
| 1764549 | 7/1971 | Fed. Rep. of Germany . |
| 2416566 | 10/1975 | Fed. Rep. of Germany . |
| 2526130 | 12/1976 | Fed. Rep. of Germany . |
| 2726324 | 12/1978 | Fed. Rep. of Germany . |
| 3342329 | 11/1983 | Fed. Rep. of Germany . |
| 811983 | 4/1959 | United Kingdom . |
| 1149838 | 4/1969 | United Kingdom . |
| 1289206 | 9/1972 | United Kingdom . |

Primary Examiner—Donald A. Griffin
Attorney, Agent, or Firm—Hill, Van Santen, Steadman & Simpson

[57] ABSTRACT

An electrical capacitor formed of metallized dielectric layers connected alternatingly to two power lead projections by the presence or absence of metal-free insulating strips includes a wavy cut edge and a smooth cut edge on alternate dielectric layers to which metal coatings are applied for improved adhesion and electical contact.

20 Claims, 8 Drawing Figures

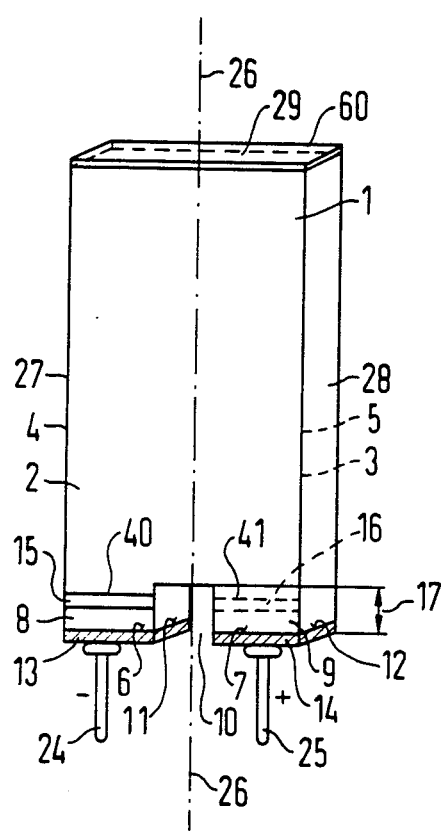
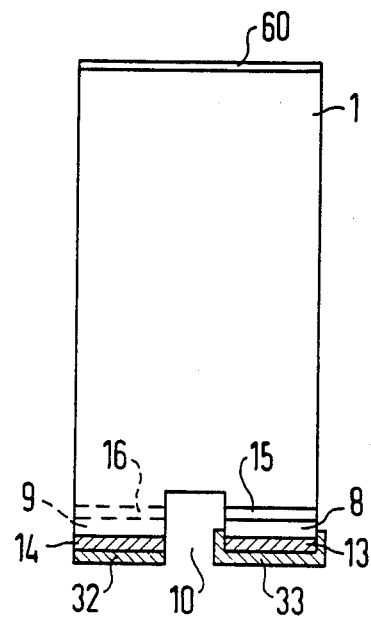

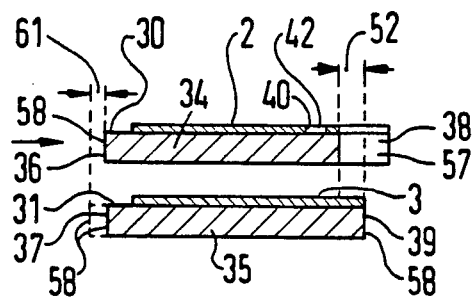
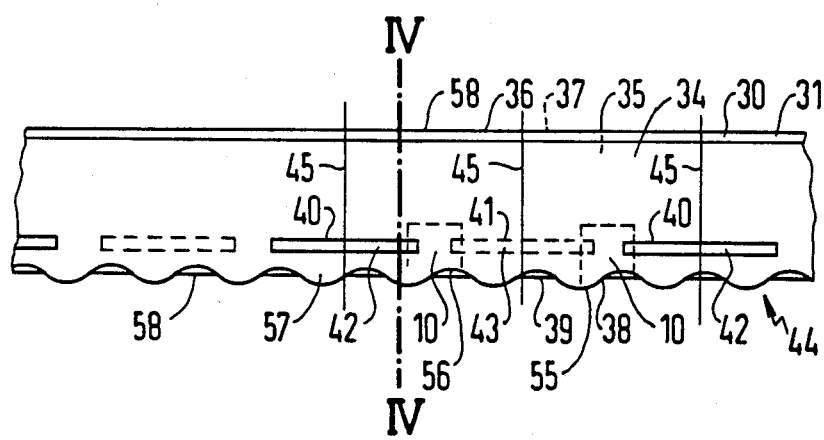
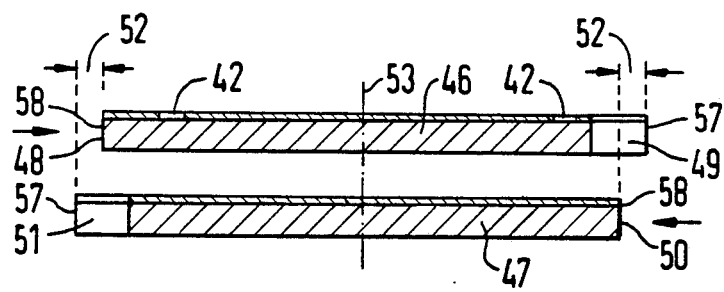

ELECTRICAL CAPACITOR AND METHOD FOR THE MANUFACTURE THEREOF

BACKGROUND OF THE INVENTION

1. Field of the Invention

The present invention relates generally to an electrical capacitor of stacked dielectric layers with metal coatings between the layers and, more specifically, to an end face arrangement on the dielectric layer stack.

2. Description of the Prior Art

The subject matter of U.S. Pat. No. 4,563,724 is an electrical capacitor composed of a consolidated stack of dielectric layers layered one on top of another. Each dielectric layer is provided with a metal coating wherein alternating ones of the coatings extend to the ends of alternating ones of two projections which are formed by an incision which proceeds in the direction of the thickness of the stack and roughly in the center of one side thereof. The end surfaces of the projections in the consolidated stack are provided with metal contact layers, which connect the antipolar metal coatings to one another. The capacitor includes the following features:

(a) the dielectric layers of the capacitor are composed of plastic films;
(b) the coatings are composed of regenerably thin layers of valve metal and cover one surface of each dielectric layer practically up to the edges of the longitudinal sides as well as up to both sides of the projections and, if need be, up to the edge of the upper narrow side of the stack which lies opposite the narrow side containing the incision;
(c) alternating from dielectric layer to dielectric layer, one of each of the two projections are provided with metal-free insulating strips, whereby the depth of the incision is greater than the width of the remaining metal strip and, preferably, coincides with the inside edges of the insulating strips or extends beyond these edges into the stack; and
(d) the metal layers connecting the antipolar coatings to one another at the projection end surfaces are manufactured by means of metal spraying.

GB Pat. No. 811,983 discloses forming an irregular surface on the end of a capacitor roll including rolling the capacitor of a strip with irregular or wavy edges to provide secure adhesion of the sprayed metal contacts. Such round windings are adequately stable in and of themselves and do not entail the same manufacturing problems as in the manufacture of stack capacitors. Other non-uniform capacitor edges are shown in EP-A1 0 011 033 and in German Pat. No. 24 16 566.

Additional features of the U.S. Pat. No. 4,563,724 capacitor will be set forth in conjunction with the following section describing the present invention.

SUMMARY OF THE INVENTION

The present invention improves the adhesion and electrical contact reliability of the metal layers produced by metal spraying on the stacked layer structure of an electrical capacitor to obtain a capacitor which is mechanically stable and easy to manufacture and in whose manufacture known measures can The present invention is embodied in a capacitor in which alternate ones of the dielectric layers have wavy cut edges and other alternate ones have smooth cut edges to which end surface metal contacts are applied. More specifically, the present electrical capacitor is of the species set forth above in the discussion of U.S. Pat. No. 4,563,724 and is inventively characterized by the following further features:

(e) as a consequence of wavy cut edges in the manufacture of the dielectric bands, the ends of the projections of the respectively first dielectric layers comprise wave hills and wave valleys; whereas the ends of the projections of the respectively second dielectric layers are limited by smooth cut edges;
(f) the dielectric layers are laterally offset relative to one another by such an amount that the smooth cut edges of the second dielectric layers at the projection ends are located roughly in the center between the wave hills and the wave valleys of the first dielectric layers; and
(g) at the upper, narrow side of the stack, both the first dielectric layers as well as the second dielectric layers have smooth cut edges.

In capacitors of the type described in the initially cited U.S. Pat. No. 4,563,724, the problem arises during manufacture that the dielectric bands which have metal layers are wound onto a drum must be guided laterally with high precision so that the lateral gradient remains as extremely slight as possible. Otherwise, the initial, or original, capacitors which form a plurality of mother capacitor rings do not remain stable, so that a lateral guidance becomes necessary. On the other hand, the stack of which the electrical capacitor is composed must also be mechanically stable in its finished condition. This stability, however, is deteriorated because the individual dielectric layers at the upper narrow side of the stack are not firmly joined and also because the edges of the projections of all dielectric layers may possibly be fashioned as wavy cut edges.

The term "wavy cut edge" as used herein is employed for every type of non-uniform edge without limitation, i.e. simple wave cuts of a sine function having different amplitudes and/or different frequencies or further edge limitations fashioned in an arbitrary fashion as set forth and shown, for example, in EP-A1 0 011 033 and as similarly likewise shown in German Pat. No. 24 16 566.

A preferred development of the present invention is that the coatings on every dielectric layer, or at least on every second dielectric layer, leave metal-free strips free at the upper narrow side of the stack as insulating strips and that a schoopage-applied metal layer is included on the narrow side.

One advantage of the present invention is that by offsetting the dielectric layers at the narrow side of the stack by a slight amount relative to one another cleaving of the stack is prevented.

The subject matter of the initially cited patent further relates to a method for the manufacture of electrical capacitors wherein tapes of plastic metallized on one side particularly having a wave cut at the edge side, are layered as dielectric layers. The layers form an original, or primitive, capacitor on a drum and the original, or primitive, capacitor is divided into the desired individual capacitors perpendicular to the layer planes. Preferrably a plurality of dielectric layers and coatings respectively forming a mother capacitor have capacitatively ineffective intermediate layers arranged thereon and in turn have capacitatively effective coated dielectric layers arranged over the intermediate layers for the next mother capacitor and so on. The original, or primitive, capacitor which is formed in this fashion, is provided with end contact layers and, subsequent thereto, is divided in the region of the intermediate layers and in a direction perpendicular thereto. The patent thus includes the following method steps:

(a) metallized tapes are wound onto a drum, the metallized tapes potentially including continuous, metal-free strips at one edge each, whereas intermittent metal-free insulating strips in the winding direction are generated in the regions of the opposite edges and at spaces therefrom. The intermittent insulating strips are generated prior to winding such that the insulating strips, when the tapes are wound onto the drum, lie in a plane perpendicular to the winding axis and so that each end of each of the insulating strips extend into or proceed slightly beyond a region where the incision will later lie;

(b) during winding onto the drum, the tapes are guided such that the centers of the insulating strips of the upper tape are symmetrically arranged over the centers of the spaces between the insulating strips of the lower tape in the finished mother capacitor;

(c) after the winding and consolidation of the original, or primitive, capacitors or, respectively, mother capacitors, at least the end face formed by the edges is provided with a metal layer by means of metal spraying while still on the drum;

(d) after the division into individual mother capacitors, incisions are produced perpendicular to the winding direction in the center between two adjacent cut lines, so that the two projections are formed at each capacitor depending upon the basis of the width and depth of these incisions;

(e) severing the individual capacitors, if need be after fastening the power leads, by sawing along cut lines which proceed through the centers of the insulating strips; and (f) completion of the capacitors by applying cap-shaped power leads or other power leads insofar as these have not already been secured in method step (e).

Another object of the present invention is to improve the method set forth in U.S. Pat. No. 4,563,724 in order to produce stable capacitors with well-adhering metal layers in a particularly simple way.

The improved method is characterized in that a first metallized plastic tape having a smooth cut edge at one edge and a wavy cut edge at the opposite edge and a second metallized plastic tape having smooth cuts at both opposite edges are wound onto a drum having a lateral offset by an amount relative to one another, the amount of the offset being such that the smooth cut edges of the lower tapes are disposed between the wave hills and the wave valleys of the wavy cut edge at the edge of the upper tape.

The method is preferably characterized in that a metal layer is also schoopage-applied onto the end face of the original, or primitive, capacitor which was formed from the edges of the tapes having the smooth cut edges, this end face forming the upper narrow side of the stack in the finished capacitor.

To this end, it is also an advantage of the present invention to wind these edges of the plastic tapes so that they also offset by an amount relative to one another.

Another method for the manufacture of electrical capacitors of the invention derives from claim 9 in combination with claim 8 of the cited patent and provides that tapes of plastic metallized on one side having a wavy cut at an edge are layered as dielectric layers on a drum to form an original, or primitive, capacitor. The original capacitor is divided into the desired use capacitors perpendicular to the layer planes, whereby capacitatively ineffective intermediate layers may be arranged on a plurality of dielectric layers and coatings respectively forming a mother capacitor and the capacitatively effective dielectric layers with the coatings for the next mother capacitor are in turn arranged on these intermediate layers. The original capacitor which has been formed in such fashion is provided with end contact layers and, subsequently thereto, is divided in the region of the intermediate layers and in the direction perpendicular thereto, including the following method steps:

(a) metallized tapes are wound onto the drum, these metallized tapes being provided with intermittent metal-free insulating strips in the winding direction at both edges and at intervals therefrom, being provided therewith before or during winding such that the insulating strips lie in a plane perpendicular to the winding axis while being wound onto the drum and both the ends as well as the beginnings of the insulating strips project into the region of the later incision or proceed slightly beyond this region;

(b) during winding onto the drum, the tapes are guided such that the centers of the insulating strips of the upper tape are arranged symmetrically over the centers of the spaces between the insulating strips of the lower tape in the finished mother capacitor;

(c) after the winding and consolidation of the original, or primitive, capacitors or, respectively, the mother capacitors, metal layers are applied by metal spraying to both end faces formed by the edges while still on the drum;

(d) after the division into individual mother capacitors, incisions are generated at both sides perpendicular to the winding direction in the center between two respective cut lines, the two projections arising on the basis of the width and depth of these incisions;

(e) severing the individual capacitors, if need be after securing power leads, by sawing both along cut lines which proceed through the centers of the insulating strips as well as along a cut line which lies parallel to the edges in the center of the mother capacitor; and (f) completion of the capacitors by applying cap-shaped power leads or other power leads insofar as these have not already been secured in method step (e).

In accord with the present invention, the improvement of this method is characterized in that, of the metallized plastic tapes to be wound, the upper tape comprises a smooth cut edge at one edge and a wavy cut edge at the opposite edge, whereas the lower tape, in opposition to the upper tape, comprises a wavy cut edge at one edge and a smooth cut edge at the opposite edge.

During winding onto the drum, the tapes are preferably guided laterally offset relative to one another by an amount such that the respective smooth cut edges are placed centrally between the wave hills and wave valleys of the respective wavy cut edges.

A somewhat modified variation of this method is inventively characterized in that, of the metallized plastic tapes to be wound, the upper tape is provided with smooth cut edges at both edges, the lower tape contains wavy cut edges at both edges and, measured from wave hill to wave hill, is broader than the upper band, preferably, by twice the amount of the distance from the wave hills to the wave valleys of a wavy cut edge.

The present invention, thus, provides a capacitor end face to which a sprayed metal contact layer is applied in which surface contact is made by each of the metallized coatings on the dielectric layers with the metal end face layer for improved adhesion and electrical contact.

BRIEF DESCRIPTION OF THE DRAWINGS

FIG. 1 is a perspective view of a capacitor according to the principles of the present invention with power leads secured thereto;

FIG. 2 is a front elevational view of a capacitor of the present invention for integration in chip format;

FIG. 4 is a cross section along the line IV—IV of FIG. 5 showing two plastic tapes to be wound with one another to form a capacitor of the present invention;

FIG. 5 is a plan view of a portion of two tapes lying above one another and to be wound with one another to form a capacitor of the present invention;

FIG. 6 is another embodiment of two tapes to be wound above one another, shown in cross section along the line VI—VI of FIG. 7;

DESCRIPTION OF THE PREFERRED EMBODIMENTS

Figure 3:
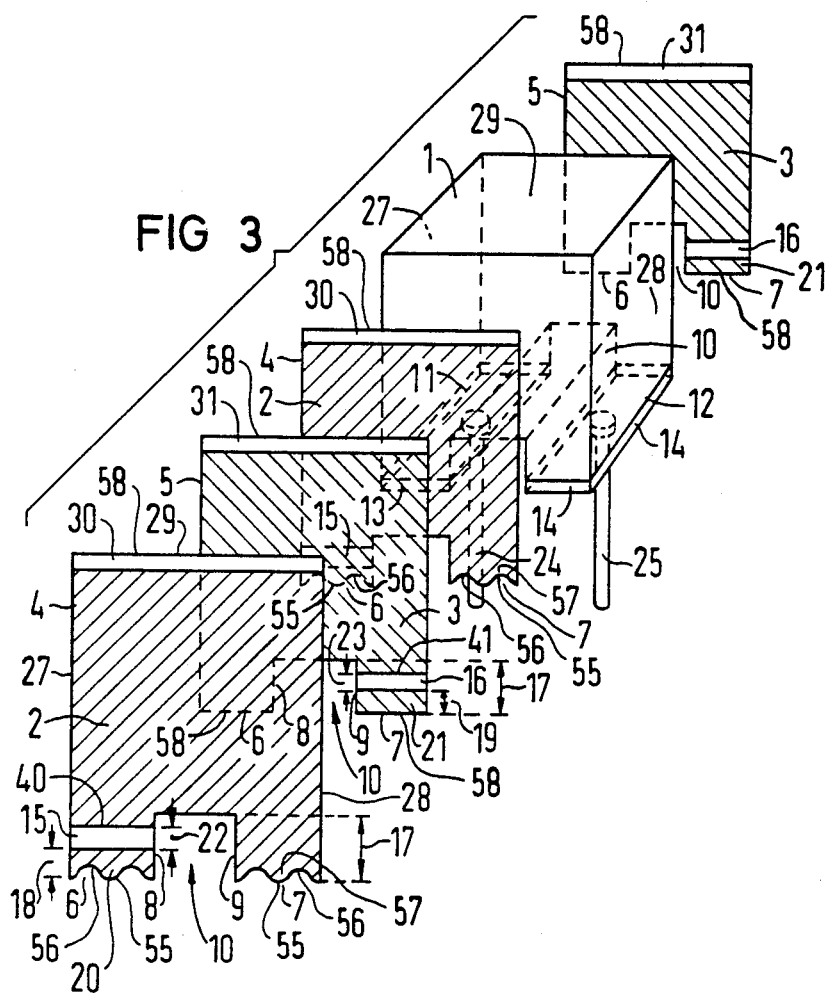
FIG. 3 is a partially exploded view of the capacitor of FIG. 1.

The electrical capacitor of FIG. 1 is composed of a consolidated stack 1 of a plurality of dielectric layers 4 and 5 which are provided with coatings 2 and 3, respectively. As a consequence of an incision 10 in the direction of the thickness of the stack 1, i.e. perpendicular to the dielectric layers 4 and 5, projections 8 and 9 are formed. The projections 8 and 9 include ends 6 and 7 having surfaces 11 and 12 of the consolidated stack 1. Metal layers 13 and 14 are applied to the surfaces 11 and 12 so that the metal layers 13 and 14 connect the coatings 2 and 3 extending up to the ends 6 and 7 to one another. Due to a metal-free insulating strip 15, the coating 2 on the dielectric layer 4 is not connected to the metal layer 13, whereas the coating 3 on the dielectric layer 5 is not connected to the metal layer 14 due to the metal-free insulating strip 16. This is continued in alternating fashion through the entire stack 1, as shown more clearly in FIG. 3.

Power leads 24 and 25 are secured to the metal layers 13 and 14, for example by soldering or welding so that the capacitor 1 can be connected in a circuit.

The incision 10 has a depth 17 in the direction of a longitudinal axis 26 of the stack 1 that extends at least beyond remaining metal strips 20 and 21 (FIG. 3) or up to inside edges 40 and 41 of the insulating strips 15 and 16. Preferably, the depth 17 of the incision 10 extends somewhat into the inside edges 40 and 41 of the insulating strips 15 and 16.

The coatings 2 and 3 on the dielectric layers 4 and 5 extend to longitudinal sides 27 and 28 and, under given conditions, also extend up to a top narrow side 29, although a prefered embodiment includes metal-free insulating strips 30 and 31.

The measures explained in U.S. Pat. Nos. 3,614,561, 3,590,347 and 4,051,587 serve to achieve adequate insulation between the coatings 2 and 3. This also applies to the surfaces deriving in the cut, or incision, 10, for increased insulation is also needed here. Since the electrical capacitors of the present invention are applied to a voltage lying above the later threshold voltage in a known way before they are finished for the purpose of regenerating voids, locations of inadequate insulation in the specified cut surface regions can likewise cure, i.e. regenerate, and thus guarantee the necessary insulation of the cut surfaces.

Identical reference characters are employed in FIG. 2 for parts corresponding to those in FIG. 1. Instead of power leads 24 and 25, the capacitor of FIG. 2 is provided either with power leads 32 in the form of metal layers or with power leads 33 in cap form at both of the feet formed by the projections 8 and 9 which have arisen as a result of the incision 10. The caps 33 are distinguished in that they partially surround the foot. Both of these embodiments 32 and 33 of the power leads serve to integrate the capacitor as a chip. Given power leads 32 in the form of metal layers, the capacitor 1 resides on contacting locations of a printed circuit and is soldered thereto, whereas, given power leads 33 in cap form, the capacitor 1 can also be integrated on the printed circuit lying sidewardly.

In the capacitor of FIG. 3, the first three and the last one of the dielectric layers belonging to the stack 1 are shown in an exploded view. The coatings 2 and 3 on the respective dielectric layers 4 and 5 extend up to the two longitudinal sides 27 and 28 of the stack 1. The coatings 2 and 3, in some embodiments, can also extend up to the narrow side 29 but, in the present exemplary embodiment, the metal-free strips 30 and 31 are shown along the upper narrow side 29 of the stack 1.

The projections 8 and 9 having the ends 6 and 7 are formed by the incision 10. On the first dielectric layer 4, and on subsequent alternate layers 4, the metal coating 2 extends up to the end 7 of the projection 9, whereas the coating 3 extends up to the end of the projection 8 on the first dielectric layers 5 and on subsequent alternate substantially identical layers 5. Alternating from dielectric layer 4 to dielectric layer 5, metal-free strips 15 or 16 are arranged on the projections 8 and 9 so that remaining metal strips 20 and 21 remain. The depth 17, of the incision 10 should at least exceed the width 18 or 19 of the remaining metal strips 20 and 21. The depth 17 preferably extends up to the inside edges 40 or 41 of the metal-free insulating strips 15 or 16 or projects somewhat beyond the inside edges. In other words, the depth 17 of the incision 10 is greater than the cumulative regions 18 of the remaining metal strip 20 and 22 of the metal-free insulating strips 15 or, respectively, of the remaining metal strips 21 and 23 of the metal-free strip 16. Also to be taken into consideration in the depth 17 of the incision 10 is the thickness of the metal layers 13 and 14 (FIG. 1) which are located on the surfaces 11 and 12 formed by the ends 6 and 7 of the projections 8 and 9.

The ends 6 and 7 of the dielectric layers 4 include a wavy cut edge 57 composed of wave hills 55 and wave valleys 56. In contrast thereto, the ends 6 and 7 of the projections 8 and 9 of the dielectric layers 5 have smooth cut edges 58. The alternating arrangement of dielectric layers 4 having wavy cut edges 57 and dielectric layers 5 having smooth cut edges 58 at the ends 6 and 7 of the projections 8 and 9 is an essential component of the present invention, as is the presence of smooth cut edges 58 at all dielectric layers 4 and 5 at the opposite edges which form the narrow side 29 in the consolidated stack 1.

The methods of the present invention for the manufacture of the capacitors of the invention are described with reference to FIGS. 4 through 8. FIGS. 4 and 5 show two plastic tapes 34 and 35 provided with metal layers 2 and 3, respectively, as coatings which are to be wound onto a drum or a wheel (not shown) with one another.

The coating 2 extends up to the right-hand edge 38 (with reference to FIG. 4) and is provided with the intermittent insulating strip 42, which separates the coating 2 from the edge 38 in the finished capacitor so that the coating 2 only extends up to the inside edge 40 of the insulating strip 42. The same is true of the coating 3 on the lower tape 35 which, due to the insulating strip 43, only extends up to the inside edge 41 in the finished capacitor.

The edge 38 of the tape 34 is provided with a wavy cut edge 57, whereas the edge 36 comprises a smooth cut edge 58. The smooth cut edges 58 at the edges 36 and 37 serve the purpose of guiding the tapes 34 and 35 during the winding process. The tape 35, which is provided with the coating 3, likewise has a smooth cut edge 58 at its edge 39. During the winding process, the two tapes 34 and 35 are offset relative to one another such that the smooth cut edge 58 arrives roughly in the center between the wave hills 55 and the wave valleys 56 to form the end face 44. The amount of the lateral offset 52 takes this requirement into consideration and amounts to about 0.05 through 0.2 mm in practice. It is also dependent on the amplitude of the wavy cut of the wavy cut edge 57.

Metal-free strips 30 and 31 are provided in the proximity of the edges 36 and 37, these metal-free strips 30 and 31 serving the purpose of guaranteeing an adequate insulation at this face end of the later capacitor because a sawing operation is not carried out at this face end. In order to consolidate the stack 1, a metal layer 60 (FIGS. 1 and 2) can be schoopage-applied to this face end which represents the narrow side 29 of the stack 1 in the later capacitor. It is recommendable for the purpose of better fixing of the metal layer 60 to this face end to also offset the edges 34 and 35 relative to one another by an amount 61 which guarantees that an electrical contact between the metal layer 60 and the metal layers 2 and 3 nonetheless does not arise. However, electrical contact only to the coatings 2 or only to the coatings 3 is allowable.

The incisions 10 are introduced later at the locations shown with broken lines in FIG. 5 and the mother capacitor is cut into finished individual capacitors at cut lines 45.

Figure 7:
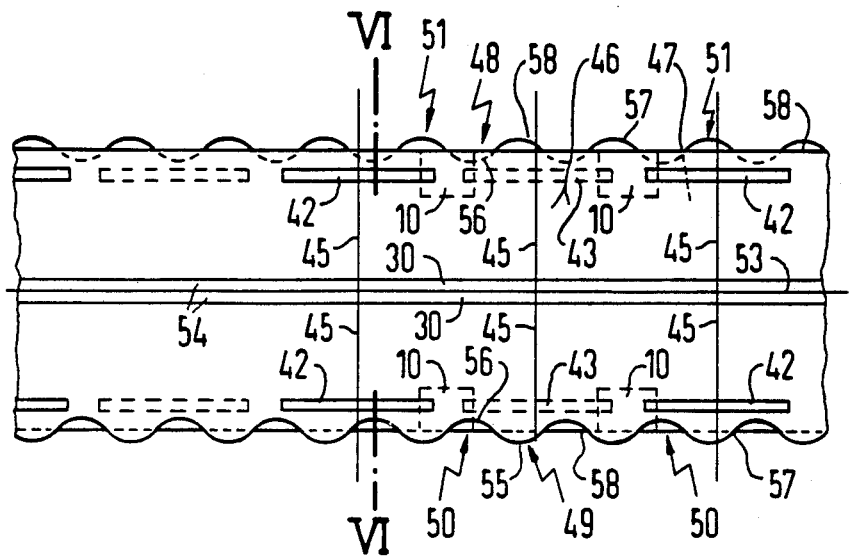
FIG. 7 is a plan view of two plastic tapes placed above one another and to be wound with one another in another embodiment of the method of the present invention.

FIGS. 6 and 7 represent another embodiment of a method for the manufacture of the capacitors of the present invention where FIG. 6 is a cross section along the line VI—VI in FIG. 7. In this method, two plastic tapes 46 and 47 are wound with one another, as disclosed in U.S. Pat. No. 4,563,724 in claim 9 in combination with claim 8 and in combination with FIG. 6 therein. The plastic tapes 46 and 47 having metal coatings each include smooth cut edges 58 at edges 48 or, respectively, 50 and wavy cut edges 57 at the respective opposite edges 49 and 51. Wavy cut edge 57 and smooth cut edge 58 alternate in this fashion in the finished capacitor which is formed by means of a saw cut along the line 53.

A lateral offset of an amount 52 is selected in similar fashion as described with reference to FIG. 4 so that the coatings are contacted by the metal end face layers on the surface of both the wavy cut edges 57 as well as the smooth cut edges 58 and not only at their lateral edge. More specifically, the wave hills 55 project somewhat beyond the edge 58 of the end face and therefore offer a good site for planar contact, whereas the wave valleys 56 leave surface regions of the coatings of the lower tape 47 free for a planar contacting.

After these two tapes 46 and 47 have been wound onto a drum for manufacturing an original or primitive, capacitor composed of a plurality of mother capacitor rings, metal coats are provided at the end faces, the individual mother capacitor rings are divided and the incisions 10 are then generated proceeding from both sides. Preceding or following this operation, the mother capacitors are divided into individual stacks along the cut lines 53 or 45 for FIG. 5, by means of appropriate sawing, as set forth above, these individual stacks then being further processed as set forth above.

The coatings on the two tapes 46 and 47 can be continuous across beyond the center, for an adequate edge insulation is achieved there on the basis of the sawing process, under given conditions, in conjunction with the regeneration processes. However, it is also possible to situate a metal-free insulating strip 54 in the center through which the cut line 53 proceeds, so that the metal-free strips 30 and 31 arise at the narrow side 29 of the stack 1, as set forth in conjunction with FIGS. 1 through 3.

Figure 8:
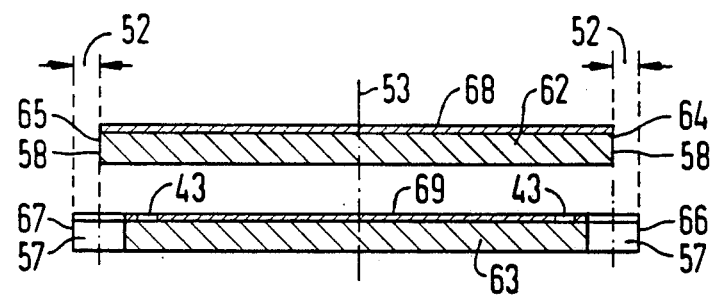
FIG. 8 is a cross section similar to that of FIGS. 4 and 6 showing a further embodiment of two plastic tapes to be wound with one another.

Another alternative embodiment of the present method is shown in FIG. 8 wherein, in contrast to the method shown in FIGS. 6 and 7, plastic tapes 62 and 63 having metal layers 68 and 69 are wound with one another and the upper tape 62 is provided with smooth cut edges 58 at both edges 64 and 65, whereas the lower tape 63 contains wavy cut edges 57 at both edges. Measured from wave hill to wave hill, the upper tape 63 is wider than the lower tape 62 by twice the amount 52, so that a lateral offset, as set forth in greater detail above, is guaranteed in the finished capacitor. The finished capacitor of this method also forms the structure set forth in FIGS. 1, 2 and 3.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. An electrical capacitor, comprising:
   a consolidated stack formed of a plurality of dielectric layers layered on top of one another, said dielectric layers being composed of plastic films;
   two projections formed in said stack by an incision in the direction of the thickness of said stack perpendicular to said dielectric layers and substantially in the center of one side thereof;

metal layers formed by metal spraying on at least an end surface of said two projections;

a metal coating composed of regenerably thin layers of valve metal and covering one surface of each of said dielectric layers, said metal coatings on alternate layers extending to alternate ends of said two projections to contact said metal end surface layers and form antipolar coatings, said metal coatings extending substantially to the edges at the longitudinal sides of said dielectric layers;

said metal coatings defining metal-free insulating strips alternating from dielectric layer to dielectric layer on said two projections, said metal-free insulating strips forming remaining metal strips at the ends of said two projections, and said incision having a depth greater than said remaining metal strips;

alternating first ones of said dielectric layers having wave cut edges at the ends of said two projections and smooth cut edges at a side opposite said wave cut edge, said wave cut edges forming wave hills and wave valleys; and alternating second ones of said dielectric layers having smooth cut edges at the ends of said two projections and at a side opposite said two projections, said second ones of said dielectric layers being offset from said first ones of said dielectric layers to dispose said smooth cut edges at said two projections between said wave hills and said wave valleys of said wave cut edges.

2. An electrical capacitor as claimed in claim 1, wherein said smooth cut edges at the ends of said two projections are disposed substantially centrally of said wave hills and said wave valleys of said wave cut edges.

3. An electrical capacitor as claimed in claim 1, wherein said metal coatings on at least one of said first ones of said dielectric layers and said second ones of said dielectric layers end spaced from a side opposite said two projections and further comprising:

a schoopage-applied metal layer on said opposite side.

4. An electrical capacitor as claimed in claim 3, wherein said first ones of said dielectric layers and said second ones of said dielectric layers are offset relative to one another at said opposite side.

5. A method for manufacturing an electrical capacitor, comprising the steps of:
(a) generating intermittent metal-free insulating strips on a first metallized plastic tape having a smooth cut edge and an opposite wavy cut edge;
(b) generating intermittent metal-free insulating strips on a second metallized plastic tape having first and second opposite smooth cut edges;
(c) winding said first and second metallized tapes together on a drum so that said insulating strips lie in a plane substantially perpendicular to a winding axis;
(d) conducting said first and second metallized tapes during winding so that the centers of said insulating strips of said first tape are disposed above the spaces between said insulating strips of said second tape and so that said first tape is offset laterally from said second tape so that one of said smooth cut edges of said second tape lies between the wave hills and wave valleys of said wavy cut edge of said first tape;
(e) providing a metal layer by metal spraying on a first end face formed by said overlying smooth cut edge and said wavy cut edge;

(f) generating incisions in said first end faces perpendicular to the direction of winding and extending to the respective ends of said intermittent metal-free insulating strips on said respective first and second tapes;
(g) severing said wound tapes into individual capacitors by sawing along cut lines on either side of said incisions, said cut lines being substantially in the center of each of said metal-free insulating strips; and
(h) applying power leads to said end face on either side of said incisions.

6. A method as claimed in claim 5, wherein step k is performed before step j.

7. A method as claimed in claim 5, further comprising following step d the steps of:
(i) winding capacitively ineffective intermediate layers over said dielectric layers to form a mother capacitor;
(ii) repeating steps c and d over said capacitively ineffective layers to form an original capacitor;

8. A method as claimed in claim 7, further comprising the steps of:
parting said original capacitor into mother capacitors at said capacitively ineffective layers.

9. A method as claimed in claim 5, further comprising the step of:
applying a schoopage-applied metal layer to a second end face opposite said first end face, said second end face being formed of smooth cut edges at both said first tape and said second tape.

10. A method as claimed in claim 5, wherein step d includes: conducting said first and second metallized tapes during winding so that said smooth cut edge of said first tape opposite said wavy cut edge is offset laterally from a smooth cut edge of said second tape opposite said one smooth cut edge.

11. A method for manufacturing electrical capacitors, comprising the steps of:
(a) providing intermittent metal-free insulating strips spaced from the opposite edges of first and second metallized tapes, said first metallized tape having a first wavy cut edge and a second opposite smooth cut edge, said second metallized tape having a first smooth cut edge and a second opposite wavy cut edge;
(b) winding said first and second metallized tapes onto a drum over one another so that said insulating strips lie in planes perpendicular to a winding axis to form a mother capacitor;
(c) guiding said first and second tapes during winding so that substantially the centers of said insulating strips of said first tape overlie substantially the centers of the spaces between said insulating strips on said second tape;
(d) applying metal layers by metal spraying to first and second opposite end faces formed of respective ones of said first and second opposite edges of said metallized tapes while on said drum;
(e) generating incisions in said first and second opposite end faces perpendicular to the winding direction extending to the respective ends of said insulating strips to form projections;
(f) severing said mother capacitor into individual capacitors by sawing along cut lines extending through substantially the centers of said insulating strips and by sawing along a cut line parallel to said first and second end faces; and (g) applying power leads to said projections formed by said incisions.

12. A method as claimed in claim 11, wherein step g is perfomed before step f.

13. A method as claimed in claim 11, wherein step c includes guiding said first and second tapes so that said respective smooth cut edges are disposed between wave hills and wave valleys of said respective wavy cut edges.

14. A method as claimed in claim 11, further comprising following step c the steps of:
 (i) winding capacitively non-effective intermediate layers over said first and second metallized tapes to form a first mother capacitor;
 (ii) repeating steps b and c and i to form additional mother capacitors, said mother capacitors forming a primitive capacitor.

15. A method as claimed in claim 14, further comprising following step d the step of:
 dividing said primitive capacitor into mother capacitors at said intermediate layers.

16. A method as claimed in claim 14, further comprising following step e the step of:
 dividing said primitive capacitor into mother capacitors at said intermediate layers.

17. A method for manufacturing electrical capacitors, comprising the steps of:
 (a) providing intermittent metal-free insulating strips spaced from opposite edges of first and second metallized tapes, said first metallized tape having first and second opposite wavy cut edges and said second metallized tape having first and second opposite smooth cut edges, said first tape measured from wave hill to wave hill being wider than said second tape;
 (b) winding said first and second metallized tapes together onto a drum so that said insulating strips lie substantially in planes perpendicular to a winding axis to form a mother capacitor;
 (c) guiding said first and second tapes during winding so that substantially the centers of said insulating strips of said first tape overlie substantially the centers of the spaces between said insulating strips on said second tape;
 (d) applying metal layers by metal spraying to first and second opposite end faces formed by respective ones of said first and second edges of said first and second tapes while on said drum;
 (e) generating incisions in said first and second end faces perpendicular to the winding direction extending to the ends of said insulating strips, said incisions forming projections;
 (f) severing said mother capacitor into individual capacitors by sawing along cut lines extending substantially through the centers of said insulating strips and by sawing in a plane parallel to said end faces;
 (g) applying power leads to said projections.

18. A method as claimed in claim 17 further comprising following step c the steps of:
 (i) winding capacitively non-effective intermediate layers over said first and second metallized tapes to form a first mother capacitor;
 (ii) repeating steps b and c and i to form additional mother capacitors.

19. A method as claimed in claim 17, wherein step g is performed before step f.

20. A method as claimed in claim 17, wherein said first metallized tape measured from wave valley to wave valley is narrower than said second tape.

* * * * *